United States Patent [19]

Koukal et al.

[11] Patent Number: 4,865,361

[45] Date of Patent: Sep. 12, 1989

[54] CONNECTING ELEMENT FOR CONNECTING A LINE TO A COMPONENT

[75] Inventors: Heinz Koukal, Sindelfingen; Helmut Merk, Herrenberg, both of Fed. Rep. of Germany

[73] Assignee: Mercedes-Benz Aktiengesellschaft, Stuttgart, Fed. Rep. of Germany

[21] Appl. No.: 213,847

[22] Filed: Jun. 30, 1988

[30] Foreign Application Priority Data

Jun. 30, 1987 [DE] Fed. Rep. of Germany ....... 3721501

[51] Int. Cl.$^4$ ............................................. F16L 41/08
[52] U.S. Cl. ..................................... 285/197; 285/189; 285/156; 285/321; 285/921
[58] Field of Search ............... 285/197, 305, 321, 188, 285/189, 156, 906, 921

[56] References Cited

U.S. PATENT DOCUMENTS

| | | | |
|---|---|---|---|
| 1,659,470 | 2/1928 | Owen et al. | 285/197 |
| 1,908,821 | 5/1933 | Cornell, Jr. | 285/156 |
| 2,084,761 | 6/1937 | Bradley | 285/906 |
| 2,468,315 | 4/1949 | Wagner | 285/189 |
| 2,942,902 | 6/1960 | Rowland | 285/197 |
| 3,154,327 | 10/1964 | Rothschild | 285/189 |
| 3,512,808 | 5/1970 | Graham | 285/197 |
| 3,806,031 | 4/1974 | Olson | 285/197 |
| 3,856,208 | 12/1974 | Naftaly | 285/197 |
| 4,725,081 | 2/1988 | Bauer | 285/321 |

FOREIGN PATENT DOCUMENTS

| | | | |
|---|---|---|---|
| 20213 | 12/1980 | European Pat. Off. | 285/197 |
| 0089867 | 3/1983 | | |
| 7009185 | 3/1970 | Fed. Rep. of Germany. | |
| 2734753 | 2/1979 | Fed. Rep. of Germany. | |
| 2856064 | 7/1980 | Fed. Rep. of Germany. | |
| 3120045 | 12/1982 | Fed. Rep. of Germany. | |
| 8519104 | 11/1985 | Fed. Rep. of Germany. | |
| 1249677 | 10/1971 | United Kingdom. | |
| 1296536 | 11/1972 | United Kingdom. | |
| 1409224 | 10/1975 | United Kingdom. | |

Primary Examiner—Thomas F. Callaghan
Assistant Examiner—Anthony Knight
Attorney, Agent, or Firm—Barnes & Thornburg

[57] ABSTRACT

A connecting element for connecting a fluid line to a component which can be acted upon fluidically, comprising a C-shaped retaining clamp and a bore which passes through at an angle to the retaining clamp is attached to a connection bore of the component in such a way that a push-in connection piece of the fluid line, which is pressed into the retaining clamp transversely to its longitudinal axis, is at the same time inserted through the bore and into the connection bore for forming a fluidic push-in connection.

10 Claims, 1 Drawing Sheet

U.S. Patent    Sep. 12, 1989    4,865,361
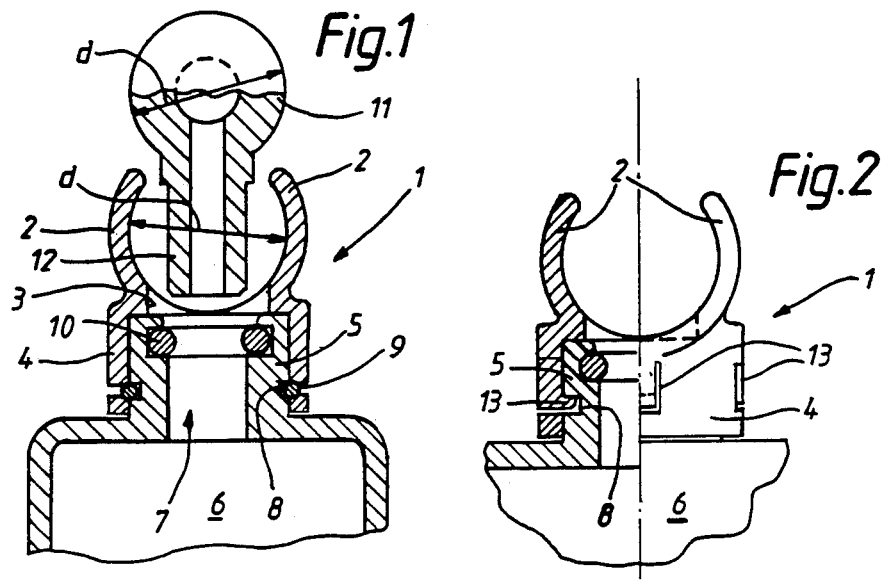
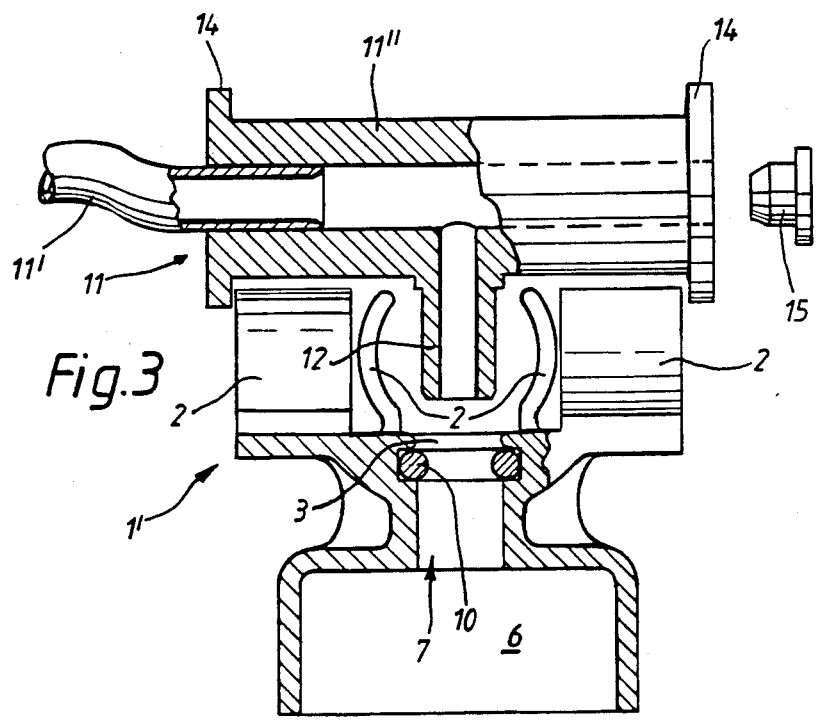

CONNECTING ELEMENT FOR CONNECTING A LINE TO A COMPONENT

BACKGROUND AND SUMMARY OF THE INVENTION

The invention relates to a connecting element for connecting a fluid line to a component which can be acted upon fluidically.

Connecting elements of this generic category have been disclosed for both cables (German Utility Model No. 7,009,185) and for pipelines (German Unexamined Published Application DOS No. 2,734,753). They hold the particular through line on a wall or on a component of vehicles. They themselves are inserted with a hollow expanding plug (shank part) into a bore in the wall or the vehicle component and are secured in the bore by driving a core stem or expanding pin into the through bore of the expanding plug. In connecting elements of this type, the short distance between the particular line and the wall/component is advantageous.

Furthermore, a connecting element for lines has been disclosed (German Unexamined Published Application DOS No. 3,120,045) which enables lines to be attached to components in two different axes and/or two different planes.

An object of the invention is to design a connecting element of the type mentioned above in such a way that a fluidic push-in connection can thereby be made between a fluid line, pushed into its retaining clamp transversely to its longitudinal axis and provided with a push-in connection piece, and the component and can be directly secured without separate means of attachment.

This object is achieved according to the invention by providing a connecting element comprising at least one C-shaped retaining clamp into which the line can be pressed transversely to its longitudinal axis while the retaining clamp is temporarily expanded elastically, for securing to the component carrying the connecting element, and a through bore which is arranged at an angle to the longitudinal axis of the retaining clamp or the line, passes through towards a bore in the component and is provided for leading through a push-in part, wherein the connecting element through bore has at least the same diameter as the compound connection bore of the component to be acted upon by a fluid under pressure or pressure via the line which is embodied as a pipe or/and a hose and is connected to the connection bore in an axially aligned manner for leading through a push-in connection piece which is fluidically firmly connected to the line and extends at an angle to the longitudinal axis of the line and is to be inserted into the connection bore of the component.

When there is an extremely small distance between fluid line and component—which, e.g., can be a pneumatic regulating element, a vacuum accumulator, a valve or a pump—considerable ease of assembly and dismantling is achieved with the connecting element described. Abutment contours for the attachment do not need to be provided either on the fluid line itself or on its push-in connection piece arranged at an angle, since the line itself is directly secured at its outer periphery in the manner of a pipe clip. If need be, a short length of pipe having a branching push-in connection piece will have to be inserted into a non-inherently rigid hose line. Nor is it imperative for the fluid line to be interrupted at the push-in connection, for a push-in connection piece can by all means be arranged on a through fluid line if necessary even subsequently—when the connecting element according to the invention is used.

These advantages distinguish the connecting element according to the invention from fluidic push-in connecting systems which, e.g., have been disclosed by German DOS No. 2,856,064 or by German Utility Model No. 8,519,104. Apart from the larger distance at which a fluid line has to be guided towards a component in said prior art even when angle connectors are used and which in restricted installation conditions, e.g. at central-locking regulating elements in motor vehicle doors, can represent a negative feature, abutment contours for the clip mountings are provided in said prior art in each case at the push-in connection pieces themselves. Both push-in connecting systems cannot be separated without a tool. Nor do they provide any suggestion for achieving the object of the invention.

With the connecting element according to the invention, the free selection of the feed direction of the fluid line to the component is retained by a freely rotatable arrangement of the connecting element on the connection piece of the component in the same manner as in the use of angle or T-pieces of the push-in connecting system according to German Offenlegungsschrift No. 2,856,064, according to certain preferred embodiments.

Even in a one-piece arrangement of the connecting element on the component according to certain preferred embodiments of the invention, a limited freedom of the feed direction can be maintained when a plurality of retaining clamps arranged at an angle to one another are provided.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic sectional view which shows a connecting element constructed in accordance with a first preferred embodiment of the invention connected in a positive-locking manner to a connection piece of a component by a spring clasp;

FIG. 2 shows, in a partial sectional view, a clip connection between the connecting element and the connection piece constructed according to another preferred embodiment of the invention; and FIG. 3 shows a connecting element integrally formed in one piece with a component and having a plurality of retaining clamps arranged at an angle to one another to an enlarged scale, constructed in accordance with yet another preferred embodiment of the invention.

DETAILED DESCRIPTION OF THE DRAWINGS

A connecting element 1 has a C-shaped retaining clamp 2 and a through bore 3 opening out into the retaining clamp 2. Connecting element 1 is placed with a shank part 4 onto a connection piece 5 of a component 6. A connection bore 7 with which the through bore 3 is axially aligned penetrates through the connection piece 5. A spring clasp 9 arranged on the shank part 4 engages into an annular groove 8 provided on the outside of the connection piece 5 and makes a positive-locking connection between the connecting element 1 and the connection piece 5 of the component 6. The spring clasp 9 can be firmly arranged on the shank part 4 or—for easier removal of the connecting element—arranged on the shank part 4 in such a way that it can be pulled off outwards. A rubber sealing ring 10 is inserted into the connection bore 7.

Furthermore, FIG. 1 also shows a fluid line 11 on which a push-in connection piece 12 is arranged at an angle. The outside diameter of the line 11 is the same size d as the free (circular) cross-section of the retaining clamp 2 so that the line 11, while the retaining clamp 2 is temporarily expanded elastically, can be pressed into the latter. At the same time, the push-in connection piece 12 is inserted through the bore 3 into the connection bore 7, the rubber sealing ring 10 bearing tightly against the outer wall of the push-in connection piece 12. Thus a reliable fluidic push-in connection is made.

FIG. 2 illustrates an arrangement essentially unaltered compared with FIG. 1, except for a variant of the positive-locking connection between the connecting element 1 and the component 6 which is made here by catch projections 13 which drop into the annular groove 8 of the connection piece 5 and are integrally formed in one piece with the shank part 4. The type of construction shown so far of the connecting element 1 enables the feed direction of the fluid line 11 to the component 6 to be freely selected, since the connecting element 1 can be turned through 360° on the connection piece 5. Since at the same time the connecting element 1 has no sealing function whatsoever, the positive-locking connection can even be produced with relatively generous tolerances.

Finally, FIG. 3 shows a connecting element 1' which is integrally formed in one piece with the component 6 and has four retaining clamps 2 arranged in pairs at right angles to one another, one of which, however, has been cut away for ease of illustration. In this way, fluid lines can also be fed to the component 6 from four different directions with the connecting element 1' arranged rigidly on the component 6. The bore 3 merges seamlessly into the connection bore 7.

Here, by way of example, a fluid line 11 composed of a hose piece 11' and a pipe piece 11" is shown which can be pressed into two retaining clamps 2 lying opposite one another in alignment. The pipe piece 11" is provided at both ends with collars 14 which secure it against axial displacement in the retaining clamps in the pressed-in state. Furthermore, pipe piece 11" can be closed at one end with a plug 15—if the fluid line is not to pass through—which results in an analogous arrangement to the line 11 in FIG. 1.

The collars 14 are an additional safety feature, since the fluid line 11 is basically already fixed against axial displacement by the push-in connection piece 12 on the pipe piece 11". Safety collars could nonetheless also be provided on the non-continuous line 11 from FIG. 1 according to certain preferred embodiments. The hose piece 11' is firmly and tightly connected to the shaped part 11", e.g. adhesively bonded or welded. The axial length and also the wall thickness of the remaining clamps 2 depend on the requisite retaining forces. It is clear that, in an angled arrangement of a plurality of elongated retaining clamps, gaps have to be provided between their walls (cf. FIG. 3) so that they can be expanded elastically without impairment. The sets of clamps 2 in the arrangement of FIG. 3 also are to be spaced axially from one another to leave the central area unobstructed to accommodate selective clamping of a fluid line 11 in respective different angular orientation.

In the embodiments shown, the center axis of the through bore in each case intersects the longitudinal axis of the retaining clamp(s) at a right angle. However, embodiments are also contemplated in which:

the angle between bore and retaining clamp axis deviates from 90°, but is clearly different from 0° or 180°, and/or the two axes run with lateral offset without an intersecting point (skewed).

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A connection between a fluid line and a component which is to be acted upon fluidically by means of the fluid line which is connectable mechanically and fluidically with the component by a connecting element comprising at least one C-shaped retaining clamp into which the fluid line can be pressed transversely to its longitudinal axis while the retaining clamp is temporarily expanded elastically, for a mechanical securing of the component carrying the connecting element, and a through bore which is arranged at an angle to the longitudinal axis of the retaining clamp or the fluid line, passes through towards a connecting bore in the component and is provided for leading through a push-in part, wherein the connecting element through bore has at least the same diameter as the connecting bore of the component to be acted upon by a fluid under pressure or pressure via the line which is embodied as a pipe or/and a hose and is connected to the connecting bore in an axially aligned manner, the fluid line further having a portion for pressing into the C-shaped retaining clamp of the connecting element which includes an opening for fluidic connection which is assigned to the connecting bore of the component wherein the opening of the fluid line portion for pressing into the C-shaped retaining clamp being formed by a push-in connection piece which is fluidically firmly connected to the fluid line and projects away from the fluid line at an angle to the longitudinal axis of the fluid line and is open toward an outside, this push-in connection piece being insertable into the through bore of the connecting element and into the connecting bore of the component when the fluid line is pressed into the C-shaped retaining clamp and wherein the connecting bore of the component is equipped with a sealing device for sealing the connection which, in a pressure-sealed manner, encloses the push-in connecting piece inserted into the connecting bore of the component.

2. A connection according to claim 1, wherein the connecting element has a positive-locking connecting to the component carrying it via a shank part through which the connecting bore penetrates, the positive-locking connecting being made by at least one spring element which is arranged on the shank part of the connecting element and engages into an undercut in a connection piece of the component which is at least partly surrounded by the shank part and through which the connecting bore penetrates.

3. A connection according to claim 2, wherein the at least one spring element is designed as a spring clasp.

4. A connection according to claim 2, wherein a plurality of catch projections which are distributed over the periphery of the shank part and are integrally formed in one piece are provided as the spring elements.

5. A connection according to claim 1, wherein the connecting element is integrally formed in one piece with the component.

6. A connection according to claim 1, wherein the connections element is provided with a plurality of the C-shaped retaining clamps arranged at an angle to one anther.

7. A connection according to claim 2, wherein the connecting element is provided with a plurality of the C-shaped retaining clamps arranged at an angle to one another.

8. A connection according to claim 5, wherein the connecting element is provided with a plurality of the C-shaped retaining clamps arranged at an angle to one another.

9. A connection according to claim 6, wherein the connecting element is provided with four C-shaped retaining clamps arranged in pairs at right angles to one another and which exhibit longitudinal axes which, when lines are inserted, coincide with the longitudinal axes of the inserted lines intersecting the center axis of the through bore of the connecting bore of the component.

10. A connection according to claim 8, wherein the connecting element is provided with four C-shaped retaining clamps arranged in pairs at right angles to one another and which exhibit longitudinal axes which, when lines are inserted, coincide with the longitudinal axes of the inserted lines intersecting the center axis of the through bore of the connecting bore of the component.

* * * * *

UNITED STATES PATENT AND TRADEMARK OFFICE
CERTIFICATE OF CORRECTION

PATENT NO. : 4,865,361

DATED : Sep. 12, 1989

INVENTOR(S) : Heinz Koukal, et al.

It is certified that error appears in the above-identified patent and that said Letters Patent is hereby corrected as shown below:

On the title page, correct the assignment data to read as follows:

[73] Assignee: Daimler-Benz Aktiengesellschaft

Signed and Sealed this

Sixth Day of August, 1991

Attest:

HARRY F. MANBECK, JR.

Attesting Officer

Commissioner of Patents and Trademarks